United States Patent [19]

Scruggs et al.

[11] Patent Number: 4,888,758

[45] Date of Patent: Dec. 19, 1989

[54] DATA STORAGE USING AMORPHOUS METALLIC STORAGE MEDIUM

[76] Inventors: David M. Scruggs, 33116 Tradewind Ct., San Juan Capistrano. Calif. 92675; John M. Zabsky, 3640C S. Main St., Santa Ana, Calif. 92707

[21] Appl. No.: 123,924

[22] Filed: Nov. 23, 1987

[51] Int. Cl.$^4$ ............................ G11B 7/24; G11B 7/00
[52] U.S. Cl. ...................................... 369/101; 369/275
[58] Field of Search ................... 369/100, 275, 13, 14, 369/15; 365/121, 122; 360/114

[56] References Cited

U.S. PATENT DOCUMENTS

| | | | |
|---|---|---|---|
| 3,949,307 | 4/1976 | Chaudhari et al. | 365/122 |
| 4,238,803 | 12/1980 | Terao et al. | 369/121 |
| 4,298,975 | 11/1981 | vander Veen et al. | 369/275 |
| 4,569,881 | 2/1986 | Freese et al. | 365/122 |
| 4,615,944 | 10/1986 | Gardner | 369/13 |
| 4,680,742 | 7/1987 | Yamada et al. | 369/13 |
| 4,710,911 | 12/1987 | Yamada et al. | 369/100 |
| 4,773,059 | 9/1988 | Minemura et al. | 369/100 |
| 4,773,060 | 9/1988 | Shimada et al. | 369/100 |

Primary Examiner—Donald McElheny, Jr.

[57] ABSTRACT

An information storage system includes a memory medium having a layer of an amorphously transformable, stable metal upon a substrate, a laser or other directed energy source for changing the state of discrete regions of the layer between the amorphous and the crystalline states, in a controllable pattern to store information in the pattern, a beam source to cause X-ray or electron emission from a local region of the metallic layer, and an X-ray or electron detector for analyzing X-rays or electrons from the region to determine whether the region is amorphous or crystalline. Discrete regions are transformed to the amorphous state by heating them above the melting point and permitting them to solidify rapidly. Those regions are transformed back to the crystalline state by heating them above their crystalline transformation temperature, but not above the melting point, using the laser operating at a reduced power level.

20 Claims, 3 Drawing Sheets

DATA STORAGE USING AMORPHOUS METALLIC STORAGE MEDIUM

BACKGROUND OF THE INVENTION

This invention relates to the storage of information, and, more particularly, to an erasable memory device utilizing an amorphous metallic storage medium.

Computers and other types of information processing equipment have become indispensable to the modern industrial world. One of the key areas of continuing development of computers is the search for information storage systems, or memories, that can store ever larger amounts of information. A wide variety of types of memories are available, including random access memories and bulk storage devices.

More existing memories are based upon electrically induced magnetic transformations, wherein the magnetic state of a magnetic medium is locally transformed in a controllable pattern to store information in the pattern. The pattern of transformed and untransformed areas can be deduced by sensing whether particular areas are in one or the other of the possible magnetic states. Magnetic memories are widely used in one form for random access memory, and in other forms for bulk storage devices such as magnetic tapes and magnetic disks.

The total amount of information that may be stored in a magnetic memory is limited by the minimum size of a magnetically measurable area of a magnetic medium. Other types of storage devices have been proposed, as the demands for greater information storage have exceeded the ability to create and measure small magnetic regions.

Optical storage systems are now available commercially in a read-only form. Such optical information storage systems have readable patterns of pits or other irregularities in an otherwise smooth surface. The patterns are placed into the surface at a central location by a highly focused laser. The pattern of pits can be read by another laser because of the lower optical reflectivity of the irregularity as compared with the otherwise high reflectivity of the surface in which the pits are made. However, once the pattern of pits is made, there is no practical method for transforming the pit back to a smooth, highly reflective surface, effectively erasing the prior information so that new information can be stored in the same area.

More recently, erasable optical memory systems have been under development. In these systems, a material whose optical reflectivity is controllable and changeable between two states is coated onto a substrate. Information is stored by a system similar in many respects to that of the read-only optical memory system. However, the transformable material remains essentially smooth on the surface of the substrate, and only its reflectivity is changed, not its physical form. The state of a region is interrogated by an optical beam, whose reflection is determined by the state of the region. From this interrogation, stored information is reconstructed from the pattern of the optical states.

One material frequently considered for such erasable optical memory systems is doped tellurium oxide, which is deposited on a substrate in a thin layer, as about 0.07 microns thick. An acrylic layer is coated over the tellurium oxide to protect it from oxidation or other external influence that might change its reflectivity, apart from intentionally induced changes. A writing and erasing laser transforms a region of the layer between the amorphous and the crystalline states. The reflectivity of the tellurium oxide is different in these two states, and this difference can be read as the difference in reflectivity of the beam of an interrogating low power laser, which beam is reflected from the surface. Because the reflectivity difference involves changes in the crystalline state of the tellurium oxide in the layer, rather than the physical form of the layer, and because the transformation between the amorphous and crystalline states is reversible, information can be stored in the layer, read, and later erased, so that new information can be written into the same area.

While the erasable optical memory, once perfected, will be an imporatant advance in memory systems, there remain problems that limit its usefulness. The surface of the medium must be carefully controlled so that the reflectivity does not change due to extraneous factors. Minor warping of the surface due to heat or stresses could render it ineffective. The tellurium oxide has limited stability against damage induced by temperature changes and radiation, and the transformation between the amorphous and crystalline states can be affected by numerous external influeneces. The composition of the memory material and the structure of the protective coating are critical. Thus, at least for the foreseeable future such erasable optical memory systems will be highly sensitive to external influences, and will be used only in carefully controlled environmental conditions.

There are many applications where high density erasable memories are subjected to heat, stress, and difficult environmental conditions, as in spacecraft. Although attempts may be made to retain a stable environment, it would be desirable to have such a memory storage device that is stable in the presence of adverse environmental influences such as heat, radiation, and magnetism, and wherein the stored information is not rendered unretrievable by environmental fluctuations.

A need therefore exists for such a stable, high density, erasable memory storage device. The present invention fulfills this need, and further provides related advantages.

SUMMARY OF THE INVENTION

The present invention resides in an information storage system and a process for storing information, that utilize a storage medium which is highly stable in the presence of external environmental influences. The storage medium can be written upon, interrogated, erased, and re-written multiple times. Interrogation of discrete areas is by a non-optical method that is relatively insensitive to flatness of the surface of the medium, and completely insensitive to the optical properties of the surface. A variety of medium materials can be used, and the operability of the medium material is relatively insensitive to composition variations. The information storage system can be operated over a range of temperatures and environmental conditions, including both the write/erase and interrogation functions.

In accordance with the invention, an information storage system comprises a memory medium, including a substrate and a layer of an amorphously transformable metal upon the substrate; means for transforming discrete regions of the layer from the crystalline to the amorphous state, and for transforming discrete regions of the layer from the amorphous to the crystalline state;

means for controlling the pattern of the transformed regions to store information therein; and means for sensing whether a discrete region of the layer is amorphous or crystalline, the means for sensing including a detector for detecting radiation emitted from the volume of the discrete region. As used herein an "amorphously transformable metal" is a metal that is transformable between the crystalline and amorphous states. The detected radiation that characterizes the state of the recording medium amorphously transformable metal is preferably diffracted X-rays or electrons.

The amorphously transformable metallic recording medium is sufficiently stable to withstand an energetic beam of X-rays, electrons, particles, or photons used to produce X-rays or electrons from the interrogated area, without an uncontrolled and unintentional change of structure. The criterion for a stable recording medium is a sufficiently elevated glass transition termperature that is from about 100° C. to about 200° C., preferably about 150° C., above the operating temperature, usually ambient temperature, of the disk. A preferred method of interrogation is by analysis of a diffracted microfocused primary X-ray beam or electron beam.

Information is stored by transforming a pattern of discrete regions in the transformable metal between the crystalline and amorphous states. The state of each region is interrogated by analyzing X-rays or electrons that are emitted from the bulk or interior of the region. The X-rays or electrons are not emitted from the surface itself, but instead from the interior regions of the transformable layer. The ability to interrogate a region is therefore not dependent upon the reflectivity of a surface, which is easily altered by environmental influences. Instead, the interrogation depends upon a bulk property, the amorphous or crystalline character of the recording medium.

In a preferred approach, a write/erase laser is positioned above a planar memory medium so that a beam of laser light is directed downwardly against the layer of amorphous metal. A discrete region of the layer is transformed to the amorphous state by heating it with the laser to a temperature above its melting point, and then discontinuing the heat input. The melted pool of metal rapidly cools in contact with the underlying unmelted portion, so that it retains an amorphous structure after cooling. In this amorphous condition, the metal has little long range order. The amorphous condition is the first state of the transformable layer for the purpose of storing information.

The discrete layer is transformed to the crystalline state by heating it above its crystallization temperature, which is a termperature below the melting point and is a natural characteristic of all amorphous metals. Above the crystallization temperature, the metal transforms to the crystalline state, which is its second state for the purpose of storing information. Heating to a temperature above the crystallization temperature but below the melting temperature can be accomplished using the same laser as used for melting, but operating at a decreased power level. A region in the crystalline state can be transformed to the amorphous condition by heating it with higher laser power to a temperature above the melting point, and then discontinuing the power input to permit rapid cooling and amorphous solidification.

Interrogation of a discrete region is accomplished not by optical means, but instead by an X-ray or electron beam interrogation system. In a preferred approach, a microbeam of X-rays is directed against a discrete region, and an emitted X-ray beam is emitted from the bulk region. Where the interrogated region is crystalline, the emitted beam is diffracted according to Bragg diffraction. The X-ray spectrum exhibits an angularly dependent series of diffraction peaks. Where the interrogated region is amorphous, the emitted beam does not exhibit diffraction peaks, but instead has a smoothly varying angular spectrum. It is this difference in the diffraction pattern that is used to distinguish between the amorphous and crystalline states. The interaction of the incident X-ray beam occurs at least several atomic diameters deep within the layer, and essentially no interaction occurs with the surface atoms of the layer. Slight surface irregularities do not alter the X-ray interaction and the emitted beam, and the nature of the emitted beam is not dependent upon the optical reflectivity of the surface. Accordingly, surface strains and reflectivity variations do not alter the performance of the interrogation system. Further, changes in the internal structure of the transformable metal due to slight internal strains, temperature variations, magnetic fields, or externally introduced radiation also are tolerated. These environmental influences do affect the internal structure, but the small changes produced thereby do not qualitatively change the presence and absence of X-ray diffraction peaks in the crystalline and amorphous states of the discrete areas, respectively.

The X-ray interrogation system can use a variety of techniques to distinguish between the presence and absence of X-ray diffraction peaks in the emitted beam. The detector can be biased to produce a response only when a signal of sufficiently high maximum peak intensity is detected, and such a peak is found only where the interrogated discrete region is crystalline. The detector can also integrate the intensity of the X-ray signal, which will vary depending upon whether the interrogated region is amorphous or crystalline. Electron beam diffraction can be used rather than X-ray diffraction, and the same principles just discussed also apply to the electron beam approach.

The write/erase function and the interrogation function are accomplished readily at ambient, elevated, or reduced temperatures, up to about one-half the absolute crystallization temperature. Methods of preparing transformable material layers having crystallization temperatures of over 600° C. are known, so that the information storage system can be operated at significantly elevated temperatures, if required.

The addressable discrete regions possible with this approach can be about 0.15 micrometers in size using existing technology, with the regions spaced about 0.5 micrometers apart. The density of information stored is therefore about $4 \times 10^8$ bits per square centimeter. Further improvements in X-ray and electron beam technologies may reduce these dimensions even more, permitting higher packing of information and greater storage density.

In another embodiment, an information storage system comprises a memory medium, including a substrate and a layer of a metal upon the substrate, the metal having amorphous and crystalline states, the metal being transformable to the amorphous state by heating it above its melting point and then rapidly cooling and further being transformable to the crystalline state by heating it above its crystallization temperature and then cooling; a heating source disposed so as to be aimable at a discrete region of the layer, whereby the metal within the region may be transformed between the amorphous and crystalline states by operation of the heating source; an interrogation beam source disposed so as to be aimable at the discrete region, whereby X-rays or electrons can be excited in the discrete region to be emitted therefrom; and a detector disposed so as to be aimable at the discrete region, whereby the state of the region, as between the amorphous or the crystalline states, may be detected by the character of X-rays or electrons emitted from the region.

An associated process for storing information comprises furnishing an information storage system of the type described, transforming the state of discrete regions of the medium between the amorphous and the crystalline states to store information in the pattern of transformed regions, and detecting the state of an interrogated discrete region by measuring X-rays or electrons emitted from the discrete region.

The approach of the present invention represents an imporatant advance in the art of information storage technology. In the previously proposed erasable optical storage systems, interrogation is achieved by changes in reflection from a surface. Reflectivity, a surface property, is strongly affected by external environmental influences. The use of an X-ray or electron beam interrogation system permits interrogation of bulk properties that are less sensitive to external influences, and also provides good signal to noise discrimination between the two states, thereby reducing the error rate. The use of amorphous metals imparts stability to environmental influences. Thus, the present approach achieves performance not possible with present and proposed optical systems. Other features and advantages of the present invention will be apparent from the following more detailed description, taken in conjunction with the accompanying drawings, which illustrate, by way of example, the principles of the invention.

DETAILED DESCRIPTION OF THE PREFERRED EMBODIMENT

Figure 1:
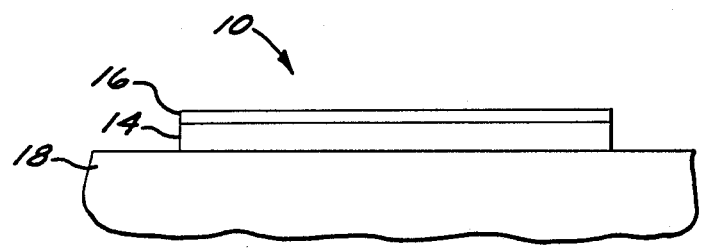
FIG. 1 is a side elevational view of a memory medium.
Figure 2:
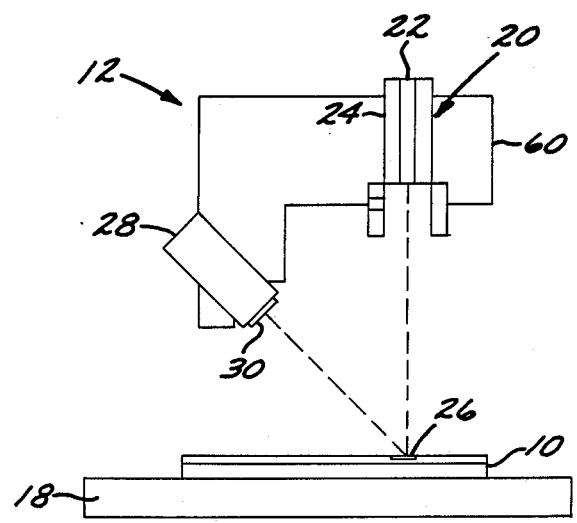
FIG. 2 is a side elevation view of a hard disk information storage device of the invention.

The present invention is embodied in a memory medium 10, illustrated in FIG. 1, and an information storage system 12, illustrated in FIG. 2. The information storage system 12 permits the high-density storage of information, its retrieval, erasure of previously written information, and rewriting of information in the erased area.

The memory medium 10 comprises a substrate 14 and a layer 16 of an amorphously transformable metal. The layer of the amorphously transformable metal is typically at least about 0.5 micrometers thick, although the thickness can be varied depending upon the size of the area to be transformed in the information storage process. The substrate 14 is made of any suitable heat sink material, such as steel or copper. The substrate 14 need not be nonmagnetic or have any special magnetic properties. The substrate is preferably supported on a base 18, which can be a stationary support or a rotatable support, as in the instance where the memory medium 10 is a hard disk storage system.

The layer 16 must be an amorphously transformable metal, preferably having a crystallization and a glass transition temperature substantially greater than the operating temperature of the unit, to provide a large temperature difference between the molten pool and the surrounding metal and to confer stability. The layer 16 is formed in any manner appropriate to the particular transformable metal. The preferred technique for forming the amorphously transformable layer 16 is by electrodeposition, since this technique produces a high quality, generally flat and uniform layer of sufficiently large lateral extent to provide a useful amount of information storage capability. The preferred transformable metal and process for its deposition on a substrate are disclosed and claimed in U.S. Pat. No. 4,529,668, whose dislosure is herein incorporated by reference.

Briefly, the preferred transformable metal set forth therein is a tungsten-cobalt (or nickel)-boron alloy having composition ranges in weight percent of about 54–67 tungsten, about 32–46 cobalt, and about 0.5–2 boron. Such alloys have melting temperatures of from about 1800° to about 2100° C., and crystallization temperatures of from about 750° to about 800° C. It is not necessary to control the composition precisely, although in most quality conscious production processes that seek uniformity of product, such control will be exercised. Composition variations are acceptable as long as the melting temperature and crystallization temperature are generally within the range indicated.

U.S. Pat. No. 4,529,668 discloses an electrodeposition process and apparatus for depositing layers of the tungsten-cobalt-boron alloy. Borophosphoric acid, dimethylamineborane or diethylamineborane, as a source of boron, an ammonium salt of an acid selected from the group consisting of hydroxycarboxylic acid and an amino acid, and salt sources of tungsten and cobalt or nickel are mixed together at a pH from about 7 to about 10, and electrodeposited at a voltage greater than the hydrogen overvoltage of the bath and a current density greater than about 20 milliamperes per square centimeter.

The layer 16 is deposited in the amorphous state, and has a high degree of structural uniformity. There are no grain boundaries or second phases to act as irregularities. The layer 16 is generally smooth and of high quality as deposited. The metal in the layer 16 is amorphously transformable, as that term is used herein, as it can be transformed to the crystalline state by heating it above the crystallization temperature and then cooling, and back to the amorphous state by locally heating above the melting point and rapidly cooling.

FIG. 2 illustrates the information storage system 12. The memory medium 10 is mounted on the base 18. A read/write unit 20, having a laser 22 and a beam source 24 with coaxial beam paths and mounted within the same housing, is positioned above the surface of the medium 10. The unit 20 need not be mounted at any particular fixed distance above the surface of the memory medium 10, but is generally mounted fairly close to the surface for convenience. The unit 20 can be opreated in air, a significant advantage in some applications. Alternatively, a single electron beam gun may be used for all functions of the unit 20, but this approach requires that the memeory medium 10 and the electron gun be in a partial vacuum.

The laser 22 can be of any acceptable type that produces sufficient power to melt a discrete region 26 of the layer 16 of the medium 10, and which can be controlled to produce a lower power level sufficient to heat the discrete regio 26 to a temperature above the crystallization temperature but below the melting temperature. The presently preferred laser 22 is a focused semiconductor laser producing ultraviolet light.

The beam source 24 is a microfocus X-ray gun of the known type or an electron gun. In the case of an X-ray gun, the operating wavelength of the beam source 24 is selected such that the elements in the layer 16, in the preferred case principally tungsten and cobalt, do not fluoresce.

An X-ray detector 28 is mounted adjacent the memory medium 10, with a wide angle-receiving port 30 directed toward the discrete region 26. In the preferred approach, described below in relation to FIGS. 3 and 4, the signal received by the detector 28 is biased to determine whether X-ray peaks greater than a preset test level are present in the X-ray spectrum. The receiving port 30 must therefore be of sufficiently wide angle to receive at least some of the peaks in the angular X-ray spectrum emitted from the discrete region 26 when in its crystalline form. The detector 28 may be hemispherical in shape and built into a shield, to prevent escape from the unit of the diffracted X-rays.

Figure 3:
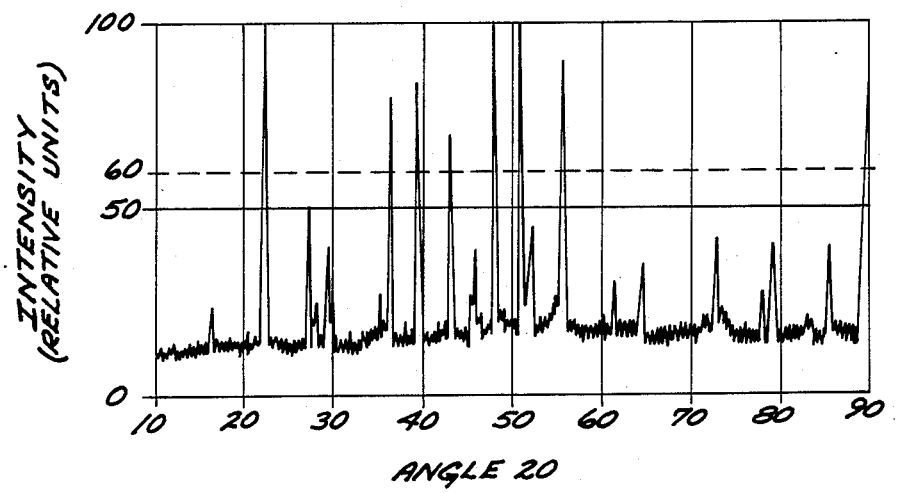
FIG. 3 is a graph of an X-ray spectrum for a crystalline material.
Figure 4:
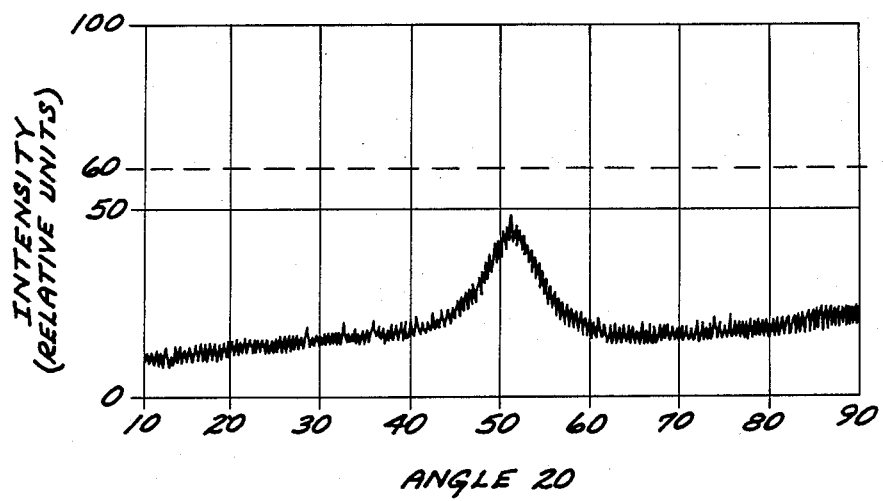
FIG. 4 is a graph of an X-ray spectrum for an amorphous material.

FIG. 3 illustrates the cobalt K-alpha X-ray spectrum of the preferred transformable metal in its crystalline form. FIG. 4 illustrates the X-ray spectrum for the same metal in its amorphous form. If the detector 28 is adjusted to register only the presence of signals having an intensity greater than 60 on the arbitrary scale of FIGS. 3 and 4, then there will be a positive indication only for the presence of the crystalline form of the amorphously transformable material in the discrete region 26. As indicated previously, the form of the curves in FIGS. 3 and 4 is determined by the subsurface crystalline or amorphous structure of the amorphously transformable metal in the discrete region 26, not by reflectivity, surface smoothness, or any other property of the surface. While the preferred embodiment for the interrogation of the region 26 of the layer 16 is by detection of X-rays, the same principles apply and are operable for interrogation by the alternative embodiment of electron diffraction.

Figure 5:
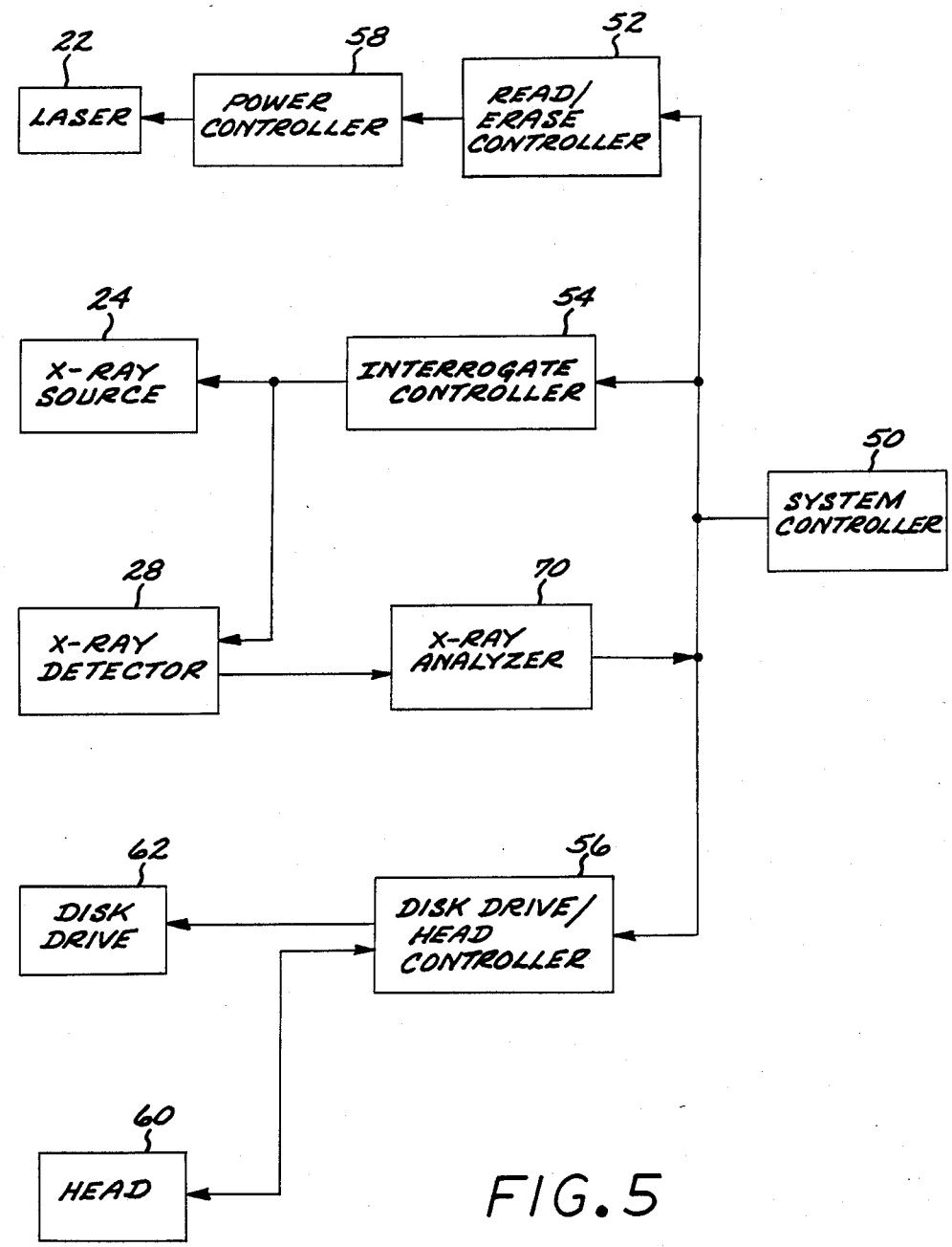
FIG. 5 is a pictorial representation of a control system for the storage device of FIG. 2.

A control system operable for the infomation storage system 12 is illustrated in FIG. 5. A system controller 50 controls an individual read/erase controller 52, interrogation controller 54 and disk drive/head controller 56 in the case of the preferred hard disk information storage system 12. The read/erase controller 52 activates and sets the power level of a laser power controller 58, which in turn operates the laser 22. The interrogation controller 54 activates the beam source 24 and the X-ray detector 28, and receives information from an X-ray analyzer 70. The X-ray analyzer 70 preferably operates in the manner previously indicated, to distinguish between amorphous and crystalline states by the amplitude and/or angular position of the peaks in the X-ray spectrum.

The laser 22, beam source 24, and X-ray detector 28 are mounted on a head 60 that is movable radially inwardly and outwardly over the rotating disk base 18, to position the instrumentation over a selected radial track of the base 18. The disk drive/head controller 56 controls the radial positioning of the head 60, as well as the rotational speed of the disk drive 62. The disk drive 62 is normally operated at a constant angular velocity, and the head 60 is indexed inwardly and outwardly, as required. The system controller 30 coordinates this process with that of the instrumentation 22, 24, and 28. The instrumentation 22, 24 and 28 is mounted to the head 60 in a constant, optimized orientation that remains fixed as the head 60 moves, so that it is moved to reside over selected tracks of the base 18, enabling transformation or reading of the discrete regions 26, one at a time.

The information storage system 12 operates as follows. To transform a selected discrete region 26 to the crystalline state, the head 60 is translated so as to position the laser 22 above the track in which the discrete region 26 is located. At the appropriate point in the revolution of the disk drive 62, the laser 22 is fired with a sufficiently high intensity to melt the discrete region 26. The laser power input is then discontinued, so that the melted discrete region is permitted to soldify. The rapid solidification against the unmelted portion of the layer 16 and the substrate 14 causes the transformable metal to soldify without crystallization and thus remain in the amorphous state.

To transform metal in the amorphous state to the crystalline state, the laser 22 is again positioned above the descrete region 26. At the appropriate time, the laser 22 is fired, but with a lower power level sufficient only to raise the temperature of the discrete region 26 to above the crystallization temperature of the transformable metal, but not so high as to melt the transformable metal. When the transformable metal is raised above the crystallization temperature, it transforms to the crystalline state and remains in this state until melted and rapidly resolidified in the manner described previously.

The cycle between the crystalline and amorphous states is therefore operable to write and erase information as patterns of individual discrete regions 26. One bit of information resides in each of the discrete regions 26, and a number of such regions transformed in particular patterns stores information as an asssembly of data bits. All or part of the information can be erased, by transforming the discrete regions 26, and new information can be overwritten.

Each discrete region 26 is interrogated by the X-ray detector 28 (or a similarly positioned electron detector) as it receives information from the selected discrete region. The X-ray or electron source 24 directs a beam of X-rays or electrons into the discrete region 26, and the resulting emitted beam is detected by the detector 28 and analyzed as to peak intensities by the analyzer 70. The interrogation of a discrete region can occur essentially simultaneously with its transformation to the crystalline or amorphous state by the action of the laser 22, as a check of the effectiveness of the transformation. If for some reason the transformation were not successful, then the transformation could be immediately repeated. The interrogation of a discrete region can also occur at a later time, to retrieve stored information.

Although a particular embodiment of the invention has been described in detail for purposes of illustration, various modifications may be made without departing from the spirit and scope of the invention. Accordingly, the invention is not to be limited except as by the appended claims.

What is claimed is:

1. An information storage system, comprising:

a memory medium, including a substrate and a layer of an amorphously transformable metal upon said substrate;

means for transforming discrete regions of said layer from the crystalline to the amorphous state, and for transforming discrete regions of said layer from the amorphous to the crystalline state;

means for controlling the pattern of the transformed regions to store information therein; and means for sensing whether a discrete region of said layer is amorphous or crystalline, said means for sensing including a detector for detecting radiation emitted from the interior volume of the discrete region.

2. The storage system of claim 1, wherein said layer is from about 0.5 to about 5 micrometers thick.

3. The storage system of claim 1, wherein said substrate is steel.

4. The storage system of claim 1, wherein said layer is an electroplated amorphous metal containing nickel and cobalt.

5. The storage system of claim 1, wherein said substrate is supported on a rotatable support.

6. The storage system of claim 1, wherein said means for transforming includes a laser positioned above said memory medium and oriented so as to emit a beam of light downwardly toward said memory medium.

7. The storage system of claim 1, wherein said means for transforming includes an electron gun positioned above said memory medium and oriented so as to emit a beam of electrons downwardly toward said memory medium.

8. The storage system of claim 1, wherein said means for sensing includes an X-ray source positioned above said memory medium and oriented so as to emit a beam of X-rays downwardly toward said memory medium, and a detector for X-rays diffracted from said memory medium.

9. The storage system of claim 1, wherein said means for sensing includes an electron beam source positioned above said memory medium and oriented so as to emit a beam of electrons downwardly toward said memory medium, and a detector for electrons diffracted from said memory medium.

10. An information storage system, comprising:

a memory medium, including a substrate and a layer of a metal upon said substrate, the metal having amorphous and crystalline states, the metal being transformable to the amorphous state by heating it above its melting point and then rapidly cooling and further being transformable to the crystalline state by heating it above its crystallization temperature and then cooling;

a heating source disposed so as to be aimable at a discrete region of said layer, whereby the metal within the region may be transformed between the amorphous and crystalline states by operation of the heating source;

an interrogation beam source disposed so as to be aimable at said discrete region, whereby X-rays or electrons can be excited in said discrete region to be emitted therefrom; and a detector disposed so as to be aimable at said discrete region, whereby the state of the region, as between the amorphous or the crystalline states, may be detected by the character of X-rays or electrons emitted from said region.

11. The storage system of claim 10, wherein said heat source is a laser.

12. The storage system of claim 10, wherein said X-ray exciter is a microfocused X-ray gun.

13. The storage system of claim 10, wherein said X-ray exciter is an electron beam gun.

14. The storage system of claim 10, wherein said beam source and said detector are arranged so that the detector receives diffracted X-rays or electrons originating from said source and diffracted by the volume of said discrete region prior to reaching said detector.

15. A process for storing information, comprising the steps of:

furnishing an information storage system, including a memory medium, including a substrate, and a layer of an amorphously transformable metal upon said substrate, means for transforming discrete regions of said layer from the crystalline to the amorphous state, and for transforming discrete regions of said layer from the amorphous to the crystalline state, and means for sensing whether a discrete region of said layer is amorphous or crystalline, said means for sensing including a detector for detecting radiation emitted from the volume of the discrete region;

transforming the state of discrete regions of said medium between the amorphous and the crystalline states to store information in the pattern of transformed regions; and detecting the state of an interrogated discrete region by measuring X-rays emitted from the discrete region.

16. The process of claim 15, wherein said layer is from about 0.5 to about 5 micrometers thick.

17. The process of claim 15, wherein said substrate is steel.

18. The process of claim 15, wherein said layer is an electroplated amorphous metal containing nickel and cobalt.

19. The process of claim 15, wherein said substrate is supported on a rotatable support.

20. The process of claim 15, wherein the information storage system further includes means for rotating said memory medium.

* * * * *